(12) United States Patent
Morkel et al.

(10) Patent No.: US 10,013,184 B1
(45) Date of Patent: Jul. 3, 2018

(54) PIPELINED COUNTER SIGNATURES

(71) Applicant: Amazon Technologies, Inc., Seattle, WA (US)

(72) Inventors: John Michael Morkel, Seattle, WA (US); Timothy Daniel Cole, Seattle, WA (US); Christopher Richard Jacques de Kadt, Seattle, WA (US); Allan Henry Vermeulen, Corvallis, OR (US)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 15/199,929

(22) Filed: Jun. 30, 2016

(51) Int. Cl.
*G06F 12/00* (2006.01)
*G06F 3/06* (2006.01)

(52) U.S. Cl.
CPC ............ *G06F 3/0613* (2013.01); *G06F 3/067* (2013.01); *G06F 3/0653* (2013.01); *G06F 3/0659* (2013.01)

(58) Field of Classification Search
CPC .............................. G06F 12/00; G06F 12/0215
USPC ........................................ 711/100, 154, 200
See application file for complete search history.

(56) References Cited

U.S. PATENT DOCUMENTS 5,742,738 A * 4/1998 Koza ...................... G06N 3/126
706/13
9,313,072 B2 * 4/2016 Katabi .................. H04L 27/265

* cited by examiner

*Primary Examiner* — Tuan Thai
(74) *Attorney, Agent, or Firm* — Baker & Hostetler, LLP

(57) ABSTRACT

A system may comprise a storage device on which counters are stored. A counter may be associated with an identifier. A computing node of the system may receive a request to modify the counter. In response to the request, a read signature may be stored and may comprise a hash of the identifier and a tolerance of the counter to change. A write signature may be stored in response to the request, and may comprise a hash of the identifier and a magnitude of the requested modification. A conflict may be detected by comparing a sum of the magnitudes of requested changes to the tolerance of the read operation.

20 Claims, 8 Drawing Sheets

PIPELINED COUNTER SIGNATURES

BACKGROUND

Recently, distributed computing environments have been employed to maintain collections of data. Multiple computing nodes, potentially distributed across various geographic regions and data centers, may be employed to collectively provide applications with an efficient mechanism for storing and retrieving data. The complexity of such systems may increase in proportion to the number of computing nodes that make up the system and in proportion to the number of clients of the system. One issue that may arise involves efficient processing of updates to the collection of data, particularly when many clients are reading and writing to the same value.

In many applications, the data maintained by the distributed system will be subject to various constraints. These may include limitations on permissible ranges of data. One example involves counter values, which may be frequently incremented and decremented, but which are constrained in some way, such as not being permitted to fall below zero. Traditional approaches to enforcing constraints such as this may involve using locks to prevent access to the data by more than once client at a time. Approaches such as this, however, may cause performance bottlenecks.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
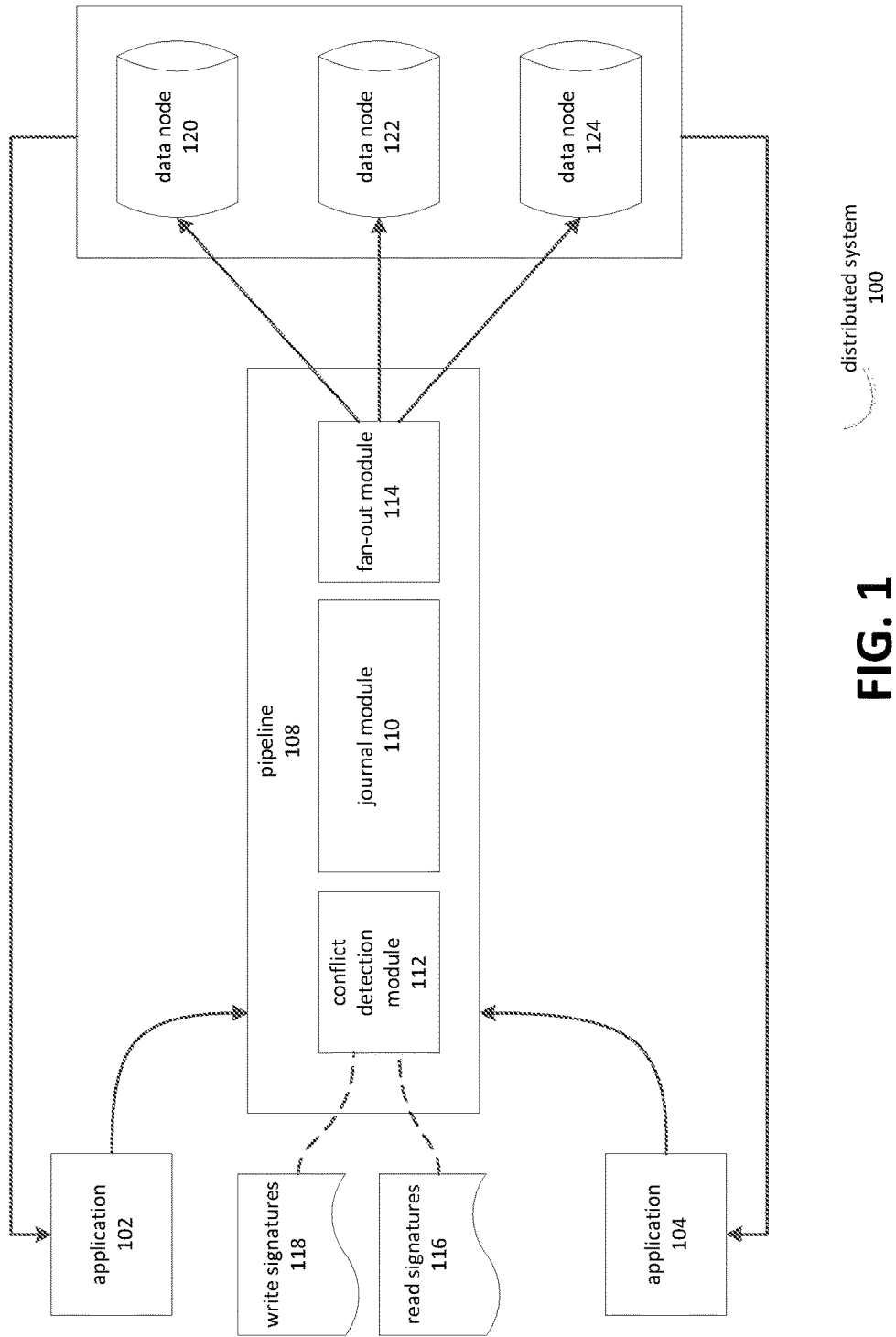
FIG. 1 is a block diagram depicting a distributed system with journaled updates.

Disclosed herein are systems, methods, and computer program products pertaining to updates to counter values maintained in a distributed system. A request to increment or decrement a counter value may conflict with other requests when the applying the requested changes would result in the counter value moving outside a prescribed range, such as falling below a minimum value. The request may be represented by a corresponding read signature and write signature. The read signature may comprise a set of values, or tuple, comprising the hash of a counter identifier and a value indicative of a tolerance of the request to changes in the counter made on behalf of other requests. The write signature may comprise the hash of the counter identifier and a value indicative of the magnitude of the change to the counter. A conflict may be detected by comparing a sum of magnitude values for other writes to the same counter, as identified using the hash, to the tolerance value of the read signature.

In an example, a distributed computing system employs journaled updates. A journaled update may involve storing a record of a requested change by a journaling component prior to the change being written to one or more storage nodes. For example, a distributed system may receive requests, from various clients, to increment and decrement a counter value. Each client may issue requests independently from other clients. A record of each request may be stored by a journaling component and then the updated counter value subsequently written to one or more storage nodes. Consequently, conflicts may occur when pending changes, recorded but not committed, would cause the value of the counter to exceed a minimum or maximum value.

An example system may comprise a storage device on which a collection of data is maintained. The collection of data may comprise a plurality of counters. The counters may be associated with an identifier. For example, the collection might include name-value pairs corresponding to counter identifiers and the corresponding value of the counter.

A computing node of the system may maintain the counter. Maintaining the counter may comprise updating the value of the counter as appropriate. This may include incrementing and decrementing the counter, and ensuring that the resulting counter value is valid with respect to constraints such as minimum or maximum values. When a request to update the counter conflicts with another pending request to update the counter, one or both of the requests may be rejected. In some instances, this may mean that the request is not stored or is not made durable by the journaling component.

The computing node may receive a request to modify a counter. The request may comprise an indication of the operation to be performed, such as an indication that the request pertains to incrementing the counter, or to decrementing the counter.

A request to modify a counter may be treated by the computing node as two separate but related operations: a reading of the current value of the counter and a writing of an updated value to the counter. For example, regarding increments and decrements, the current value of the counter may be read, an updated value calculated based on the magnitude of the requested increment or decrement, and the updated value written to the counter.

In response to receiving the request, the computing node may form a read signature corresponding to the requested modification. The read signature may be stored in a compressed bloom filter or other data structure. The read signature may comprise a hash of an identifier of the counter, such as the name component of a name value pair. The read signature may further comprise a tolerance value indicative of a permissible magnitude of change to the value of the counter. Tolerance, sometimes referred to as headroom, may represent the sensitivity of the corresponding write operation to changes made in conjunction with other operations. In some instances, it may reflect the value of a counter after a corresponding write operation has been performed.

Also in response to receiving the request to modify the counter, the computing node may form a write signature corresponding to the requested modification. The write signature may be stored in a second data structure, which may be the same structure as the first data structure in which the read signature is stored. In some instances, the write signature may be stored in a separate data structure. These approaches are equivalent, provided that the read and write signatures for a counter may both be subsequently retrieved or inspected. The write signature may comprise a hash of the identifier of the counter. The write signature may further comprise a value indicative of the magnitude of the requested modification. For example, if the request indicated that a counter should be incremented by a value of five, the magnitude value stored in the write signature might also be five. Similarly, if the request indicated that the counter should be decremented by three, the magnitude value of the signature might be three.

Conflict detection may comprise computing a sum of the magnitudes of requested modifications. For increments operations, the sum may include magnitudes corresponding only to increments. Similarly, for decrement operations, the sum may include magnitudes corresponding only to decrement operations. This approach, although not required, may reduce false negatives, at a potential cost of producing false positive reports of conflict.

Conflict detection may further comprise determining to process a requested modification when no conflict is detected. A conflict, or lack of conflict, may be detected by comparing the computed sum to the tolerance value stored in the read signature. If the sum of magnitudes is greater than the tolerance value, a conflict exists. Otherwise, the updated value may be stored.

FIG. 1 is a block diagram depicting a distributed system 100 employing journaled updates. The distributed system 100 may consist of an update pipeline 108. The update pipeline 108 may process requests to update data maintained by the system, using a journal-based technique. The update pipeline 108 may validate requests to modify data maintained by the system and make those request durable upon validation. The data may be subsequently written to one or more data nodes 120-124. This approach allows applications 102, 104 to issue requests to modify the data state without needing to wait for the data to be fully propagated throughout the system.

Data nodes 120-124 maintain a collection of data. The data may include state information for a collection of named counters. For example, one or more of data nodes 120-124 may maintain a first counter identified as "CounterA." One or more of the data nodes 120-124 may maintain a second counter identified as "CounterB." The counters in the collection be associated with minimum and maximum values. For example, if "CounterA" were to be used to represent the number of an item held in-stock, its range might be constrained between zero and ten based on not permitting "negative" inventory amounts and there being a maximum capacity for ten of this type of item in a warehouse. In another example, "CounterB" might be constrained to the range of 0-255 because its in-memory representation consisted of a single byte of memory.

Applications 102, 104 may access the current value of a counter by reading data from the data nodes 120-124. The flow of data through the distributed system 100 may be described as circular. Data may be read from the data nodes 120-124, processed by applications 102, 104, and modified by sending instructions through the pipeline 108.

Applications 102, 104 may request that operations be performed on the counters. The operations may involve incrementing the value of the counter or decrementing the value of the counter. Applications 102, 104 may initiate requests in parallel with each other. The applications 102, 104 may initiate the requests using an optimistic concurrency assumption. In other words, the applications 102, 104 may issue requests for operations to be performed a counter based on an assumption that the request is not likely to conflict with another request.

An application 102, 104 may issue instructions to modify a counter to a pipeline component 108. The pipeline component may comprise a conflict detection module 112, a journal module 110, and a fan-out module 114. In an example operation of a pipeline 108, the conflict detection module 112 may process instructions received from the applications 102, 104. If no conflict is detected, the journal module 110 may record the instructions, causing them to become durable even if not yet written to the data nodes 120-124. The fan-out module 114 may then apply the instructions to the data nodes 120-124, so that the effects of the instructions are made visible to readers of the data. For example, the applications 102, 104 may read the updated data from the data nodes 120-124.

The conflict detection module 112 may determine if committing an operation in the pipeline 108 would result in a conflict. For example, a conflict might arise if both applications 102, 104 issued requests to increment a counter, and the counter was at or near its maximum value. If "CounterA" had a maximum value of ten and a present value of nine, a conflict would arise if each of the applications 102, 104 issued a request to increment "CounterA," since the resulting value of eleven would exceed the counter's maximum value of ten. The conflict detection module 112 may detect this condition prior to committing the journaled operations.

The conflict detection module 112 may detect conflicts using read signatures 116 and write signatures 118. A signature, as used herein, refers to information indicative of an operation performed on a counter. The conflict detection module 112 may store signatures indicative of the operations within a memory-based data structure, such that the signature may be subsequently examined. In some instances, the conflict detection module 112 may store signatures in an associative data structure, which in some cases may be a probabilistic associative data structure. In some instances, the conflict detection module may store signatures in a compressed bloom filter.

A request to increment a counter may be decomposed by the conflict detection module 112 into two related operations, a read operation and a write operation. For example, a request to increment a counter by a magnitude of five may be decomposed into two operations: first reading the current value of the counter, and second adding five to the current value. Accordingly, the conflict detection module 112 may record two signatures: a read signature and a write signature. The read signature may comprise two elements, a hash of the identifier of the counter and a value indicative of headroom, or tolerance, of the corresponding write operation. The headroom value may correspond to excess capacity of the counter following the increment operation. The write signature may comprise a hash of the identifier of the counter and a value corresponding to the magnitude of the increment operation.

A request to decrement a counter may, similarly, be decomposed into a read and write operation and represented by corresponding read and write signatures. The read signature may comprise a hash of the identifier of the counter and a headroom, or tolerance, value for the corresponding write operation. The headroom value may correspond to excess capacity of the counter following the decrement operation. The write signature may comprise a hash of the identifier of the counter and a value indicative of the magnitude of the decrement operation.

Conflicting requests may be identified by examination of the read signatures 116 and write signatures 118. For example, two independent requests to increment a counter might conflict if the available headroom in the counter is insufficient. In the context of an increment, headroom refers to the difference between the counter's current and maximum values. The conflict detection module 112 might, for example, compare the sum of pending increments using write signatures, compare the amount to the headroom value of a read signature, and based on this comparison determine that a conflict exists. The conflict detection module 112 might then determine not to process a conflicting increment request.

The journal module 110 may maintain a store of instructions to modify the data state. For example, the conflict detection module 112 might validate a request to increment a counter. If the request is validated, the journal module 110 might then store a record of the corresponding instruction to increment the counter on a storage device. The instructions may be stored by the journal module 110 so as to make the record of the instructions durable, so that the changes will be applied eventually to the data nodes 120-124 even in the event of an power interruption or other system failure.

The fan-out module 114 may apply instructions to modify the counter values to the various data nodes 120-124. The fan-out module 114 may, for example, read records of the instructions from the storage device, and then apply the instructions to one or more of the data nodes 120-124. In some instances, a given counter may replicated on more than one of the nodes 120-124, in which case the fan-out modules might apply changes to the counter to each of the affected nodes. In some instances, however, the fan-out module might update only a subset of the data nodes 120-124 that maintain the counter, and rely on replication or some other mechanism to propagate the changes.

Figure 2:
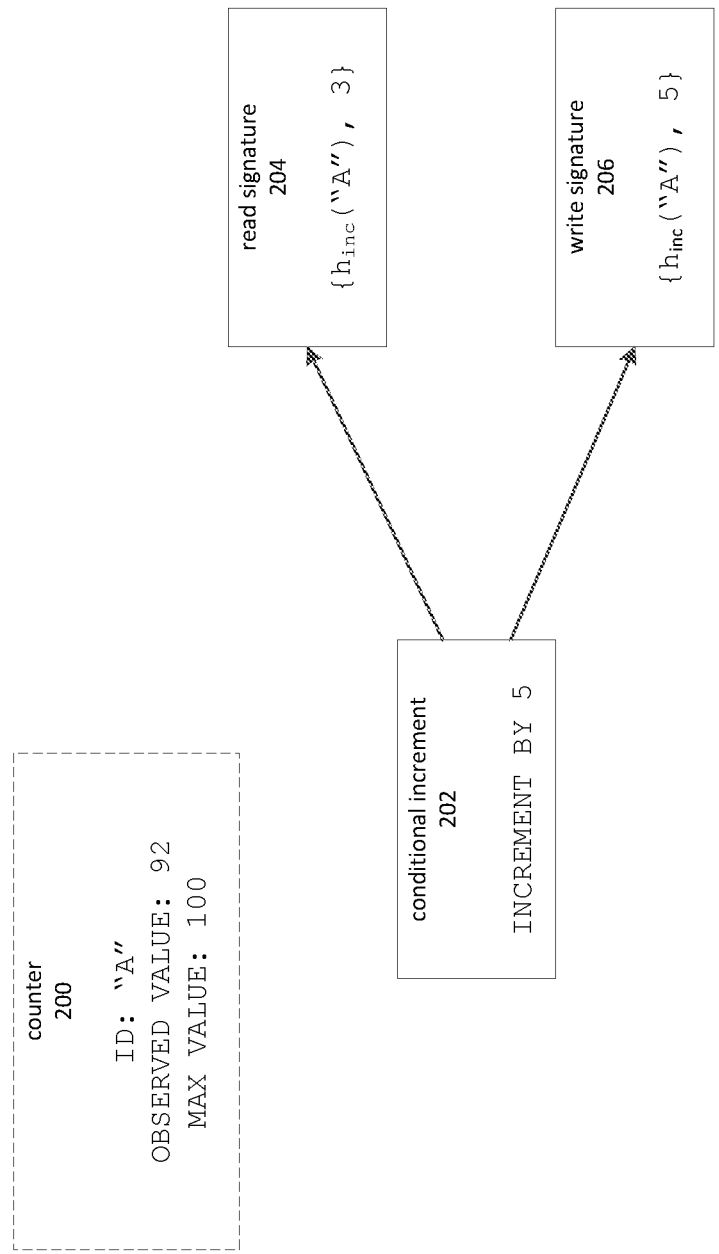
FIG. 2 is a block diagram depicting decomposition of a condition increment operation into read and write signatures.

An example of an increment operation is depicted in FIG. 2, which is a block diagram showing decomposition of a condition increment operation into read and write signatures. A counter 200 might be associated with the identifier "A" and have a maximum value of 100. It's current, observed value—which may be changing continually as increment and decrement operations are process—may be assumed, for illustrative purposes, to be 92.

A conditional increment operation 202 may be to increment counter "A" by five, on the condition that the increment operation not cause the value of the counter "A" to exceed its maximum value of 100.

The conditional increment operation 202 may be decomposed into a corresponding read operation and a corresponding write operation. The read operation may represent accessing the observed value of 92, and the write operation may represent incrementing the counter 200 to the value of 92+5=97.

The read operation may be represented by a read signature 204. The read signature may include a hash of the identifier of the counter 200, "A." In FIG. 2, this is represented as $h_{inc}$("A"). The read signature may further include a value indicative of the headroom, i.e. the tolerance, of the counter "A" after the corresponding write operation has been performed. In the example of FIG. 2, this may be the value 3, since after adding the increment amount, 5, to the current value, 92, the value of the counter 200 would be 97, three units under the maximum value of 100.

The write signature 206 may comprise a hash of the identifier of counter 200, "A," represented as $h_{inc}$("A"). In the example of FIG. 2, the read signature 204 and the write signature 206 utilize the same hash function $h_{inc}$(id). However, in some embodiments different hash functions may be used for the read and write signatures, e.g. $H_{inc\text{-}write}$(id) and $H_{inc\text{-}read}$(id). The write signature 206 may further include a value indicative of the magnitude of the increment, in this case the value 5.

Figure 3:
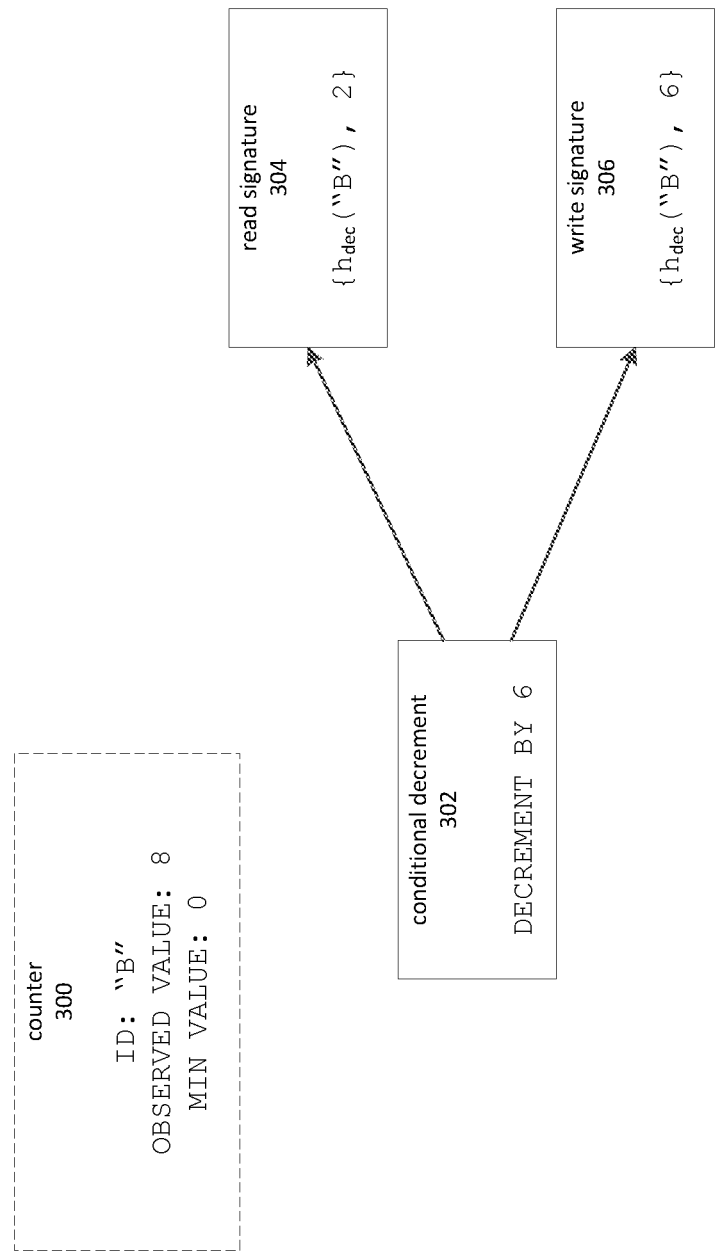
FIG. 3 is a block diagram depicting decomposition of a condition decrement operation into read and write signatures.

Conditional decrement operations may be handled similarly to conditional increment operations. FIG. 3 is a block diagram depicting decomposition of a condition decrement operation into read and write signatures. A counter 300 may be associated with the identifier "B." The counter 300 might, for illustrative purposes, be presumed to have a minimum value of 0, below which the counter cannot be decremented, and a current observed value of 8.

The conditional decrement operation 302 might correspond to a request to decrement the counter by a magnitude of 6. The conditional decrement operation 302 may be decomposed into corresponding read operations and write operations, which may in turn be represented as a read signature 304 and a write signature 306.

The read signature 304 may comprise a hash of the identifier of the counter, depicted as $h_{dec}$("B") in FIG. 3, and a value indicative of the headroom or tolerance of the corresponding write operation. The headroom value may be the amount left in the counter after the decrement is performed. In the example of FIG. 3, the headroom value might be obtained by subtracting the magnitude of the decrement, 6, from the most recently observed value of the counter, 8. Thus, the headroom or tolerance value in this example might be 2. Thus, as depicted in FIG. 3, the read signature might be described as consisting of the tuple $\{h_{dec}("B"), 2\}$.

The write signature 306 might comprise a hash of the identifier of the counter and the magnitude of the decrement. Thus, in the example of FIG. 3, the write signature might be expressed as $\{h_{dec}(A), 6\}$. Note that, as was the case with the conditional increment operation depicted in FIG. 2, the hash functions for the read signature 304 might be the same as or different from the write signature 306.

Figure 4:
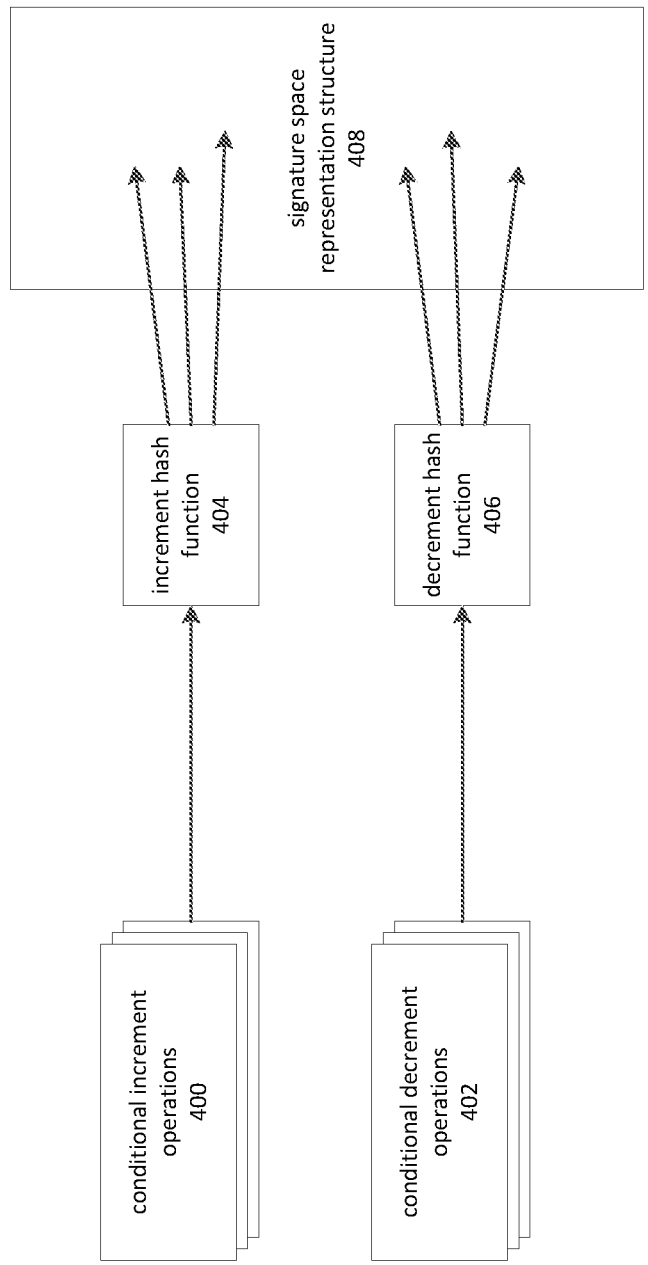
FIG. 4 is a block diagram depicting mapping of conditional increments and decrements into a signature space.

FIG. 4 is a block diagram depicting mapping of conditional increments and decrements into a signature space. In some instances, a signature space representation structure 408 may have stored within it tuples containing read and write signatures. The signature space representation structure 408 may comprise a compressed bloom filter. In some instances, the signature space representation structure may instead comprise other probabilistic data structures, or some other form of associative data structures.

Conditional increment operations 400 may be mapped by an increment hash function 404 to a location in the signature space representation structure 408. The mapping may comprise storing signature tuples such that those related to a particular counter may be retrieved with relative efficiency.

Conditional decrement operations 400 may be mapped by a decrement hash function 406 to other locations, distinct from those of conditional increments, in the signature space representation structure 408. Here too the mapping may comprise storing signature tuples so that those related to a particular counter may be retrieved with relative efficiency. Note that the retrieval may comprise location of all signatures, for a given counter, related to increment operations or location of all signatures, for a given counter, related to decrement operations.

In some instances, a single hash function (not shown) may be used in place of the increment hash function 404 and the decrement hash function 406. Separation of increment-related signatures and decrement-related signatures may still be maintained by hashing a combination of the counter identifier and an additional value indicative of the associated operation being an increment or a decrement.

In addition to the signature space representation structure 408, a distributed system may maintain a temporally ordered index of instructions to modify the state of a collection of data. The ordering information may be used in conflict detection to determine which requests are applicable when checking for conflicts. For example, the scope of signatures that are applicable to a given request may depend on temporal order. The applicable scope may correspond to the range of time from when the request was issued (e.g., when the corresponding read operation occurred) to the time at which conflict detection is performed. A temporal index may be used to restrict the set of signatures used for conflict detection to the applicable scope.

Figure 5:
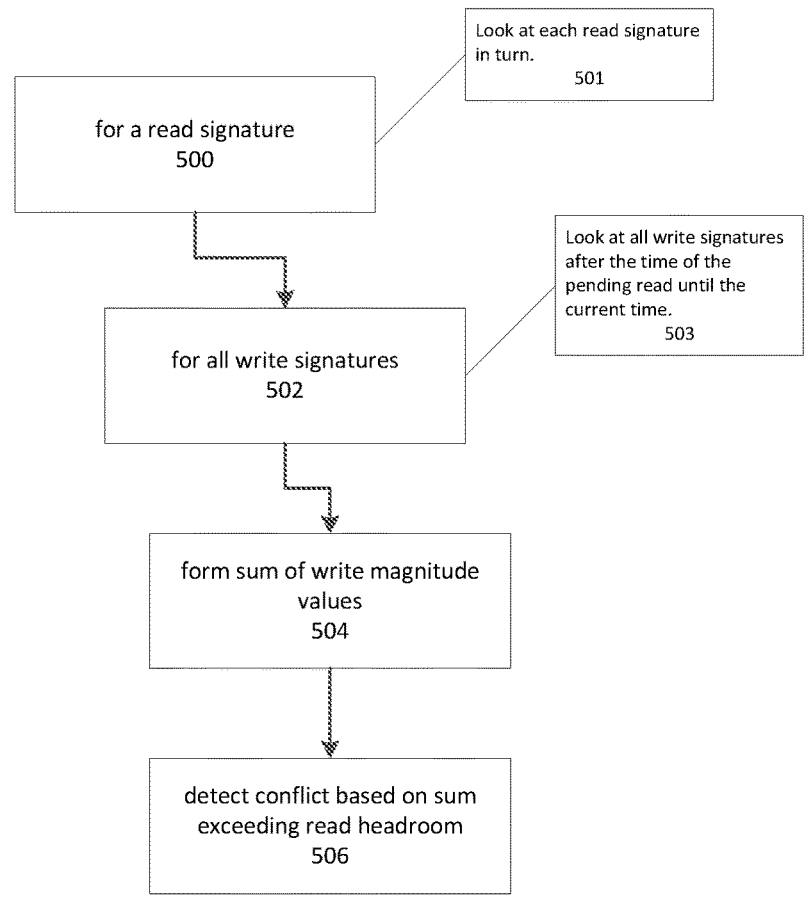
FIG. 5 is a flow diagram depicting identification of conflicts in a distributed system with journaled updates.

FIG. 5 is a flow diagram depicting an example process of identifying conflicts in a distributed system with journaled updates. Although FIG. 5 is depicted as a sequence of blocks, it will be appreciated that in certain implementations the depicted order may be altered, or certain operations performed in parallel, while remaining consistent with the disclosed process.

Block 500 and callout 501 depicts that conflict detection may proceed by iterative examination of each read operation associated with a given counter. Then, as depicted by block 502 and callout 503, write signatures for the counter may be examined. The examined write signatures may include those for all write operations that occurred after the time of the pending read up until the current time. The magnitude value stored in the write signatures may then be used to form a sum of the magnitude of the associated operation, as depicted by block 504. The sum may then be compared, as depicted by block 506, to the read headroom as identified in the read signature. If the sum exceeds the headroom in the read signature, a conflict exists.

Conflicts related to increment operations may be detected separately from conflicts related to decrement operations. For example, the process of FIG. 5 may be performed to detect increment-related conflicts and again to detect decrement-related conflicts. This approach may be used in place of using negative values to represent decrement operations and positive values to represent increments. Handling increment and decrement operations separately may increase false positives, i.e. falsely suggest a conflict exists, but may reduce false negatives.

Figure 6:
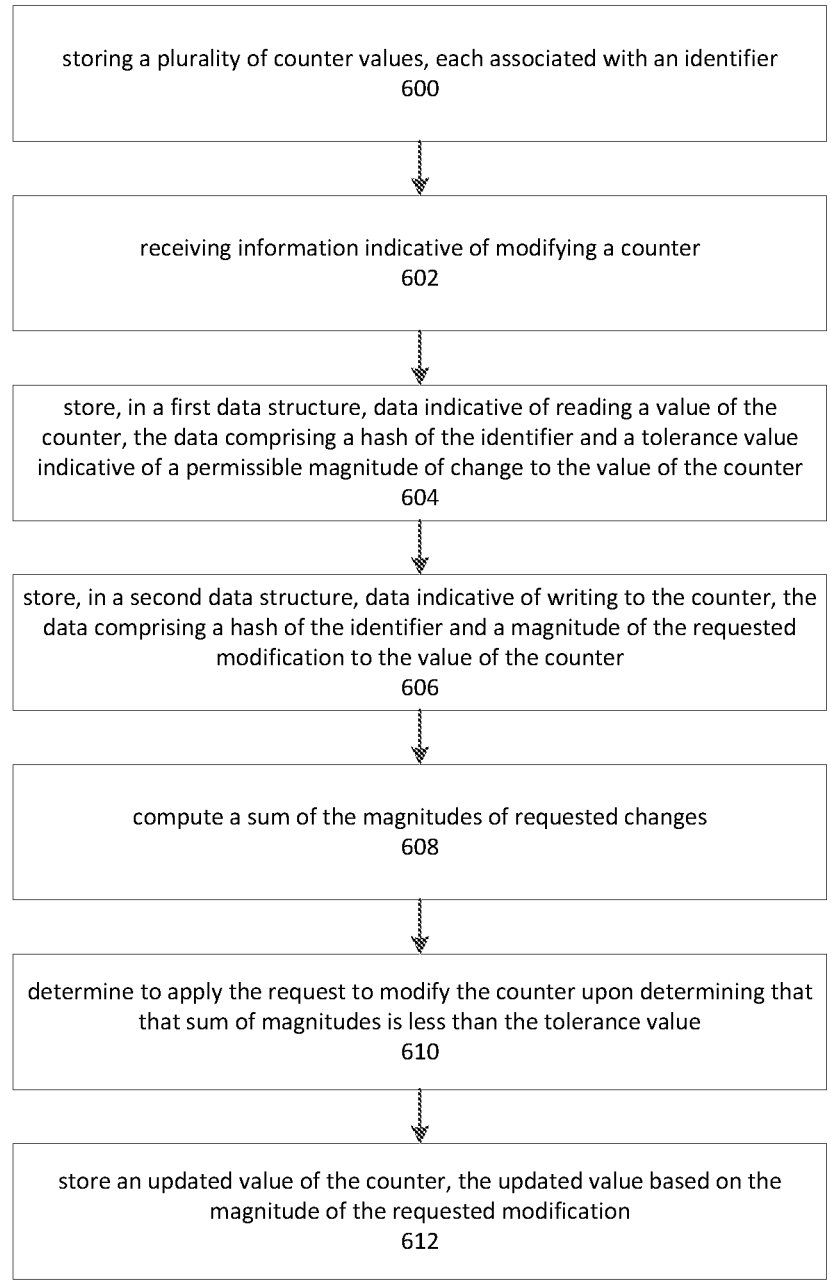
FIG. 6 is a flow diagram depicting an example process for identifying conflicting updates in a distributed system.

FIG. 6 is a flow diagram depicting an example process for identifying conflicting updates in a distributed system. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel.

Block 600 depicts maintaining a collection of data that comprises various counter values, each associated with an identifier. For example, a collection of data may comprise name-value pairs where the name identifies the associated value. The value of the name-value pair may, for example, be a numeric value which may be incremented or decremented within a permissible range of values.

Block 602 depicts receiving information indicative of modifying the counter. The information may include instructions to increment or decrement the counter by a specified amount. These instructions may be committed to the pipeline with the expectation that they will be checked for conflicts, made durable, and eventually applied to a data store.

Block 604 depicts storing a read signature corresponding to the request to modify the counter. The read signature may comprise a hash of the identifier of the counter and a headroom or tolerance value indicative of a permissible magnitude of change to the value of the counter. The headroom or tolerance value may, for example, be the difference between a minimum or maximum value of the counter and the counter's post-increment or post-decrement value. The read signature may be stored in a first data structure, such as a compressed bloom filter.

Block 606 depicts storing a write signature corresponding to the request to modify the counter. The write signature may comprise a hash of the identifier of the counter and a value indicative of the magnitude of the requested modification. The write signature may be stored in a second data structure, which may coincide with the first data structure.

Block 608 depicts computing a sum of the magnitudes of requested changes associated with the counter. The write signatures stored in the second data structure may be scanned to identify those related to the counter, and a sum of the magnitudes may be formed.

Block 610 depicts determining to apply the request to modify the counter. A conflict may exist if processing the request would cause the counter to exceed its minimum or maximum value. The request may be processed if a conflict is not detected. A conflict, if one exists, may be detected by comparing the sum of magnitudes to the tolerance value stored in the read signature associated with the request to modify the counter.

As depicted by block 612, if the request is processed the updated value of the counter may be stored, or otherwise committed or made permanent. The magnitude of the requested change may be obtained from the write signature and added to the current value of the counter. The updated value may then be committed as the new value of the counter.

Figure 7:
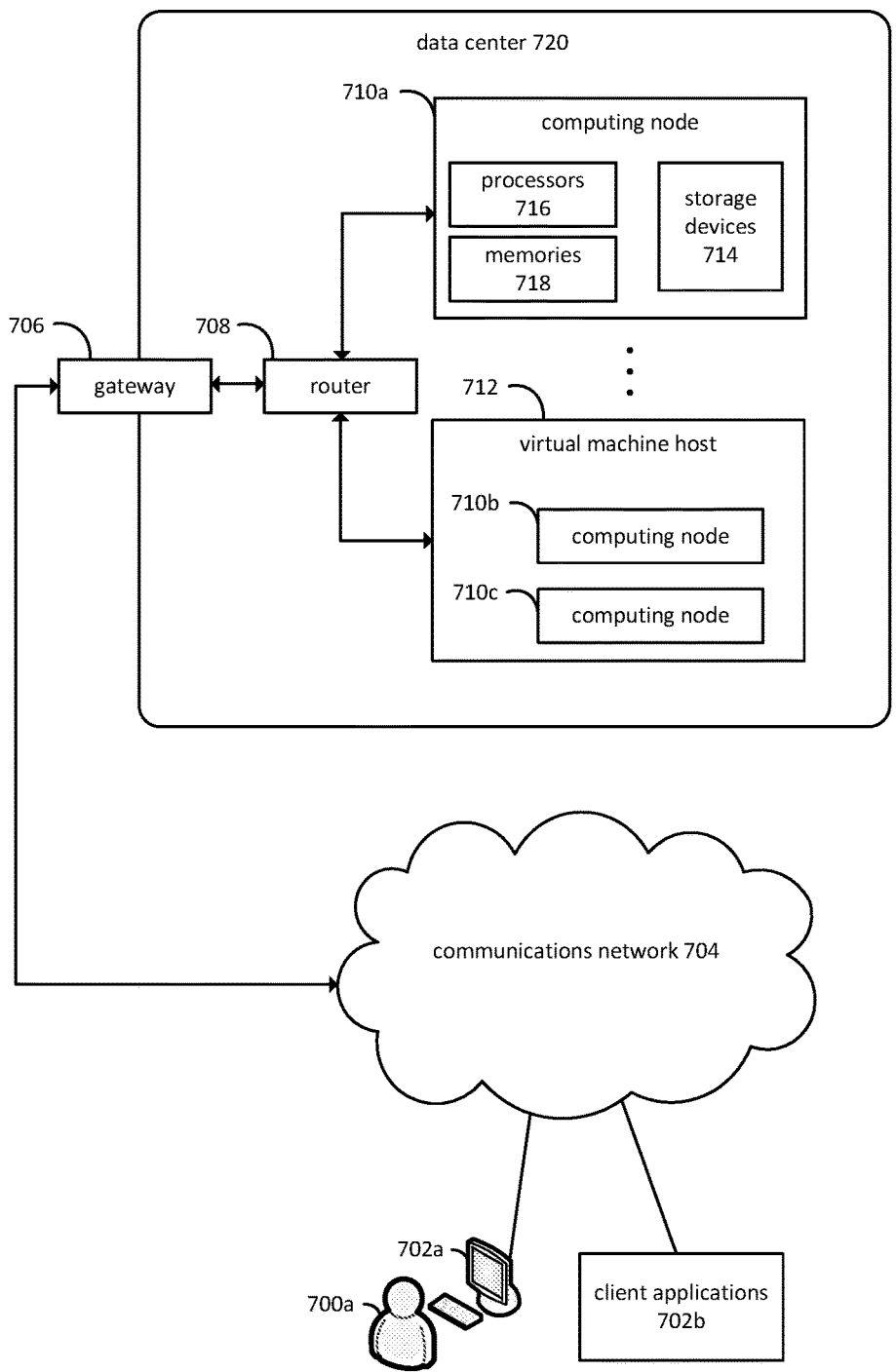
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 704 with processes executing on various computing nodes 710a, 710b, and 710c within a data center 720. Alternatively, client applications 702b may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 710a, 710b, and 710c, operating within data center 720, may be provided via gateway 706 and router 708. Numerous other network configurations may also be employed. Although not explicitly depicted in FIG. 7, various authentication mechanisms, web service layers, business objects, or other intermediate layers may be provided to mediate communication with the processes executing on computing nodes 710a, 710b, and 710c. Some of these intermediate layers may themselves comprise processes executing on one or more of the computing nodes. Computing nodes 710a, 710b, and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 718, and one or more storage devices 714. Processes on computing node 710a may execute in conjunction with an operating system or alternatively may execute as a bare-metal process that directly interacts with physical resources, such as processors 716, memories 718, or storage devices 714.

Computing nodes 710b and 710c are depicted as operating on virtual machine host 712, which may provide shared access to various physical resources, such as physical processors, memory, and storage devices. Any number of virtualization mechanisms might be employed to host the computing nodes.

The various computing nodes depicted in FIG. 7 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
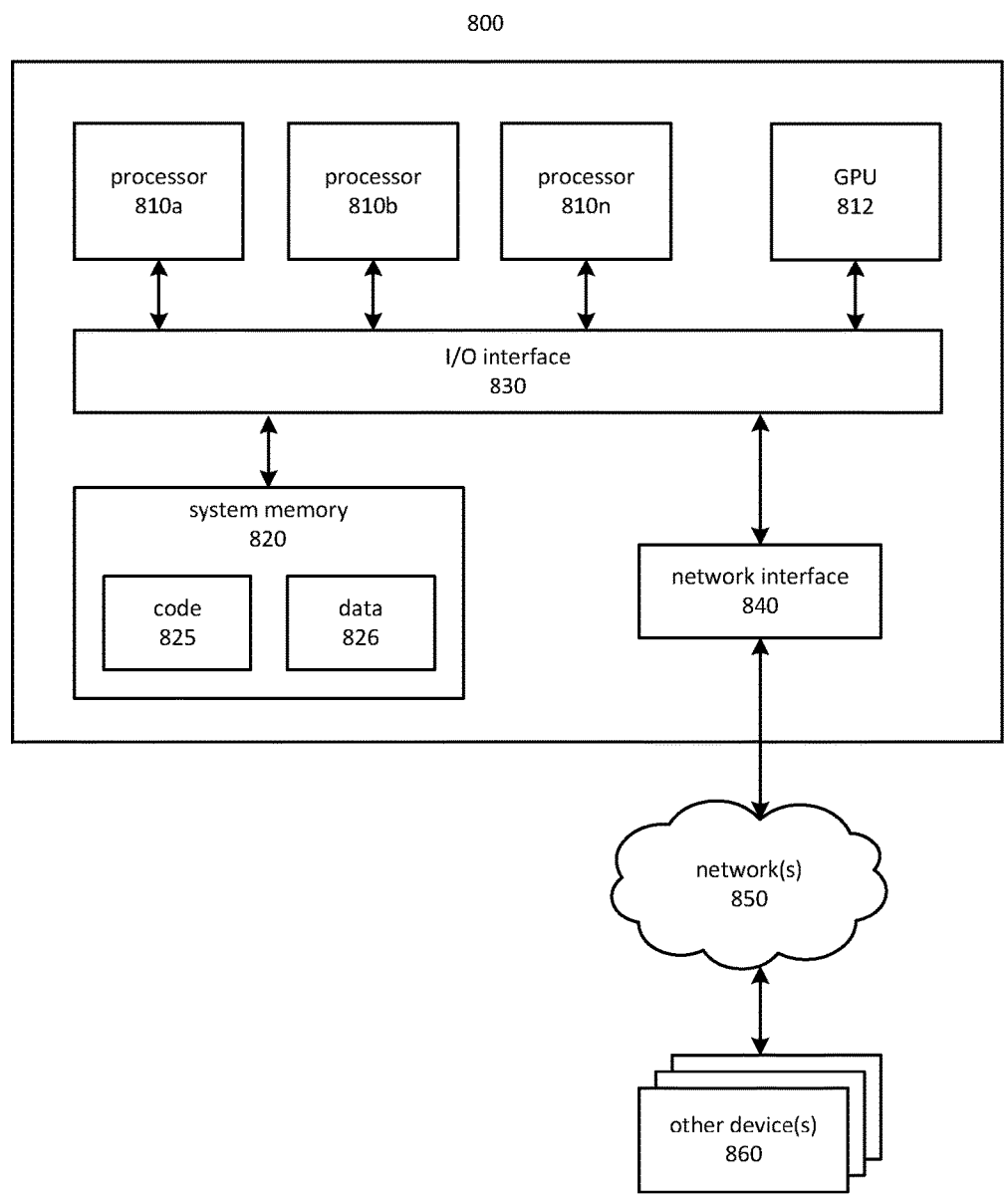
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810a, 810b, and/or 810n (which may be referred herein singularly as a processor 810 or in the plural as the processors 810) coupled to a system memory 820 via an input/output ("I/O") interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 810. In various embodiments, system memory 820 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 830 may be split into two or more separate components, such as a north bridge and a south bridge, for example. Also, in some embodiments some or all of the functionality of I/O interface 830, such as an interface to system memory 920, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   a storage device configured to store thereon a plurality of counters, wherein a counter of the plurality of counters is associated with an identifier;
   a computing node in communication with the storage device in order to maintain the counter, wherein the computing node at least:
      in response to a requested modification of the counter, stores, in a first data structure, a first data set representative of reading a value of the counter, the first data set comprising a hash of the identifier and a tolerance value indicative of a permissible magnitude of change to the value of the counter;
      in response to the requested modification of the counter, stores, in a second data structure, a second data set representative of writing to the value of the counter, the second data set comprising the hash of the identifier and a magnitude of the requested modification to the value of the counter;
      computes a sum of magnitudes of requested modifications associated with the counter, the sum comprising the magnitude of the requested modification to the value of the counter stored in the second data structure;
      determines to process the requested modification, the determining based at least in part on comparing the sum to the tolerance value stored in the first data structure; and
      stores an updated value for the counter based on the requested modification.

2. The system of claim 1, wherein the computing node at least:
   computes the hash using a first hash function when the requested modification is an increment of the counter; and
   computes the hash using a second hash function, different from the first hash function, when the requested modification is a decrement of the counter.

3. The system of claim 1, wherein the computing node at least:
  determines to disallow processing of a second requested modification of the counter, based at least in part on comparing a second tolerance value associated with the second requested modification to the sum of magnitudes of the requested modifications.

4. The system of claim 1, wherein the computing node at least:
  in response to determining that the requested modification is associated with incrementing the counter, computing the sum of magnitudes of the requested modifications by at least identifying magnitudes of increment operations associated with the counter; and
  in response to determining that the requested modification is associated with incrementing the counter, computing the sum of magnitudes of the requested modifications by at least identifying magnitudes of increment operations associated with the counter.

5. The system of claim 1, wherein the computing node at least:
  stores, in the first data structure, a first plurality of data sets representative of a plurality of readings of the counter, the first plurality of data sets comprising the first data set;
  stores, in the second data structure, a second plurality of data sets representative of a plurality of writes to the counter, the second plurality of data sets comprising the second data set; and
  computes the sum of magnitudes of the requested modifications by at least locating the second plurality of data sets in the second data structure using the hash of the identifier.

6. A method comprising:
  receiving a request to change a counter, the request comprising information indicative of a requested magnitude of change to the counter, the counter associated with an identifier of the counter;
  storing a first data comprising a representation of the identifier of the counter and data indicative of a tolerance to change of the counter;
  storing a second data comprising the representation of the identifier and the requested magnitude of change to the counter;
  computing a sum indicative of a total magnitude of unprocessed requested changes to the counter, the sum comprising the requested magnitude of change to the counter;
  determining to change the counter based on the request, by at least comparing the sum to the tolerance to change to the counter; and
  processing the request to change the counter by at least storing an updated value for the counter based on the requested magnitude of change to the counter.

7. The method of claim 6, wherein the first data and the second data are stored in a compressed bloom filter.

8. The method of claim 6, wherein the tolerance to change is based at least in part on a difference between a current value of the counter and a minimum value of the counter.

9. The method of claim 6, wherein the tolerance to change is based at least in part on a difference between a current value of the counter and a maximum value of the counter.

10. The method of claim 6, wherein the tolerance to change is based at least in part on a current value of the counter and the requested magnitude of change.

11. The method of claim 6, further comprising:
  forming the representation of the identifier using a first hash function when the request to change the counter is associated with incrementing the counter; and
  forming the representation of the identifier using a second hash function, different from the first hash function, when the request to change the counter is associated with decrementing the counter.

12. The method of claim 6, wherein the sum is computed based on operations of a same type as the requested change, and operations not of the same type are excluded from the sum.

13. The method of claim 6, further comprising:
  determining that the request to change the counter is associated with decrementing the counter; and
  computing the sum indicative of a total magnitude of requested changes by at least identifying magnitudes of decrementing operations linked to the counter by an associative data structure and ordered subsequent to the requested change.

14. The method of claim 6, wherein the first data corresponds to a read signature of the request and the second data corresponds to a write signature of the request.

15. A non-transitory computer-readable storage medium having stored thereon executable instructions that, upon execution by a computing device, cause the computing device at least to:
  receive a request to change a counter, the request comprising information indicative of a requested magnitude of change to the counter, the counter associated with an identifier of the counter;
  store, in response to the request, a first data representative of reading from the counter, the first data comprising a representation of the identifier of the counter and data indicative of a permitted magnitude of change to the counter;
  store, in response to the request, a second data comprising the representation of the identifier and the requested magnitude of change to the counter;
  compute a sum indicative of a total magnitude of requested changes to the counter, the sum comprising the requested magnitude of change to the counter;
  determine to change the counter based on the request, by at least comparing the sum to the permitted magnitude of change to the counter; and
  process the requested change to the counter by at least storing an updated value for the counter based on the requested magnitude of change to the counter.

16. The non-transitory computer-readable storage medium of claim 15, wherein the first data is representative of reading the counter in association with the request, and wherein the second data is representative of writing to the counter in association with the request.

17. The non-transitory computer-readable storage medium of claim 15, comprising further instructions that, upon execution by the computing device, cause the computing device to at least:
  form the representation using a first hash function when the request to change the counter is associated with incrementing the counter; and
  form the representation using a second hash function, different from the first hash function, when the request to change the counter is associated with decrementing the counter.

18. The non-transitory computer-readable storage medium of claim 15, comprising further instructions that, upon execution by the computing device, cause the computing device to at least:

determine that the request to change the counter is associated with incrementing the counter; and calculate the sum indicative of a total magnitude of unprocessed requested changes based at least in part on magnitudes of incrementing operations linked to the counter by an associative data structure.

19. The non-transitory computer-readable storage medium of claim 15, comprising further instructions that, upon execution by the computing device, cause the computing device to at least:

determine the permitted magnitude of change based at least in part on a difference between a current value of the counter and a minimum value of the counter.

20. The non-transitory computer-readable storage medium of claim 15, comprising further instructions that, upon execution by the computing device, cause the computing device to at least:

determine the permitted magnitude of change based at least in part on a difference between a current value of the counter and a maximum value of the counter.

\* \* \* \* \*